(12) United States Patent
Cunningham et al.

(10) Patent No.: US 6,360,175 B1
(45) Date of Patent: Mar. 19, 2002

(54) GENERALIZED MODAL SPACE DRIVE CONTROL SYSTEM FOR A VIBRATING TUBE PROCESS PARAMETER SENSOR

(75) Inventors: Timothy J. Cunningham, Boulder, CO (US); Stuart J. Shelley, Cincinnati, OH (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 09/030,453

(22) Filed: Feb. 25, 1998

(51) Int. Cl.[7] .................................................. G01F 1/84
(52) U.S. Cl. ............................ 702/56; 702/39; 702/48; 702/54; 73/861.355; 73/861.356; 73/861.357
(58) Field of Search ...................... 702/33, 39, 41–43, 702/45, 48, 50, 54, 56, 100, 103, 114, 140, 191, 194, 495, 197, 198, FOR 170, FOR 171, FOR 172, FOR 126–FOR 128, FOR 164, FOR 166, FOR 103, FOR 104, FOR 123, FOR 124; 377/21; 700/280, 281, 282; 73/861.354–861.357, 1.16, 1.82, 370, 570.5, 578, 579, 587, 592, 662–665, 668, 861.3, 861.56

(56) References Cited

U.S. PATENT DOCUMENTS

| | | | |
|---|---|---|---|
| 4,777,833 A | 10/1988 | Carpenter | 73/861.38 |
| 5,009,109 A | 4/1991 | Kalotay et al. | 73/861.38 |
| 5,301,557 A | 4/1994 | Cage et al. | 73/861.38 |
| 5,497,666 A * | 3/1996 | Patten et al. | 73/861.37 |
| 5,555,190 A * | 9/1996 | Derby et al. | 73/861.356 |
| 5,734,112 A * | 3/1998 | Bose et al. | 73/861.356 |
| 5,827,979 A * | 10/1998 | Schott et al. | 73/861.356 |

FOREIGN PATENT DOCUMENTS

| | | | | |
|---|---|---|---|---|
| DE | 19634663 | 3/1997 | | |
| EP | 0 578 113 A2 | 1/1984 | ............ | G01F/1/84 |
| EP | 0 701 107 A2 | 3/1996 | ............ | G01F/1/00 |
| WO | WO 92/14123 | 8/1992 | ............ | G01F/1/84 |
| WO | WO 95/16897 | 6/1995 | ............ | G01F/1/84 |
| WO | WO 95/29385 | 11/1995 | ............ | G01F/1/84 |
| WO | WO 97/40348 | 10/1997 | ............ | G01F/1/84 |
| WO | WO 98/07009 | 2/1998 | ............ | G01F/1/84 |

OTHER PUBLICATIONS

Cunningham; "Zero Shifts Due to Non–Proportional Damping", Micro Motion Report #10233, Part of IMAC XV, Feb. 1997, Session 8j, Structural Damping.

Bosse et al.; "Application of Modal Filtering Techinques to Vibration Control of Precision Truss", AD–vol. 45/MD–vol. 54, Adaptive Structures and Composite Material, Analysis and Application ASME 1994, pp. 281–285. (No Month).

Cunningham; "Zero Shifts in Coriolis Sensors Due to Imbalance", Procedings of AIAA/ASME/ASCE/AHS/ASC 35th Structures, Structural Dynamics and Materials Conference, Apr. 18–20, 1994, AIAA Paper 94–1621 (A94–2411a), pp. 1–10.

(List continued on next page.)

*Primary Examiner*—Hal Wachsman
(74) *Attorney, Agent, or Firm*—Chrisman, Bynum & Johnson, P.C.

(57) ABSTRACT

A drive system is taught for controlling the modal content of any number of drive signals used to excite any number of drives on a vibrating conduit such as is found in a Coriolis mass flowmeter or a vibrating tube densimeter. One or more motion signals are obtained from one or more spatially distinct feedback sensors. The motion signals are preferably filtered using a multi-channel modal filter to decompose the motion signals, each of which contain modal content at a plurality of vibration modes, into n single degree of freedom modal response signals. Each modal response signal corresponds to one of the vibration modes at which the vibrating conduit is excited. The n modal response signals are input to a drive channel having a separate processing channel for each of the n modal response signals.

20 Claims, 10 Drawing Sheets

OTHER PUBLICATIONS

Stack, Garnett, Pawlas; "A Finite Element for the Vibration Analysis of Fluid–Conveying Timoshenko Beam", AIAA Paper 93–1552, pp. 1–10 (1993). (No Month).

Timothy J. Cunningham Modal Analysis and Zero Stability of Coriolis Mass Flowmeters (1993) (M. of Science Thesis, Colorado State University (Fort Collins)), (No Month). pp. ii–vii, 1–92.

Rieder, Drahm; "A New Type of Single Straight Tube Coriolis Mass Flowmeter", Flomenko '96, presented at the $8^{th}$ International Conference (1996), p. 250–255. (No Month).

Stuart J. Shelley, Investigation of Discrete Modal Filters For Structural Dynamic Applications (1991) (Unpublished Ph.D. Dissertation, University of Cincinnati), pp. i–xvii, 1–269, (No Month).

* cited by examiner

GENERALIZED MODAL SPACE DRIVE CONTROL SYSTEM FOR A VIBRATING TUBE PROCESS PARAMETER SENSOR

FIELD OF THE INVENTION

This invention pertains to the field of drive systems for causing a conduit of a vibrating-tube-process-parameter sensor to oscillate. In particular, the present invention pertains to a system operating in the modal domain to drive any number of drivers with any modal force pattern.

STATEMENT OF THE PROBLEM

It is known to use Coriolis effect mass flowmeters to measure mass flow and other information for materials flowing through a conduit. Exemplary Coriolis flowmeters are disclosed in U.S. Pat. Nos. 4,109,524 of Aug. 29, 1978, U.S. Pat. No. 4,491,025 of Jan. 1, 1985, and Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional, radial or coupled type. Each conduit is driven to oscillate at resonance in one of these natural modes. Material flows into the flowmeter from a connected conduit on the inlet side of the flowmeter, is directed through the conduit or conduits, and exits the flowmeter through the outlet side. The natural vibration modes of the vibrating, material filled system are defined in part by the combined mass and stiffness characteristics of the conduits and the material flowing within the conduits.

When there is no flow through the flowmeter, all points along the conduit oscillate, due to an applied driver force, with identical phase or a zero-flow phase depending on the mode of the driven vibration. As material begins to flow, Coriolis forces cause a change in phase difference between any two points along the conduit. The phase on the inlet side of the conduit lags the driver, while the phase on the outlet side leads the driver. Pick-off sensors are placed on the conduit to produce sinusoidal signals representative of the motion of the conduit. Signals output from the pick-off sensors are processed to determine the change in phase difference between the pick-off sensors. The change in phase difference between two pick-off sensor signals is proportional to the mass flow rate of material through the conduit.

A typical component of every Coriolis flowmeter, and of every vibrating tube densitometer, is the drive or excitation system. The drive system operates to apply a periodic physical force to the conduit which causes the conduit to oscillate. The drive system includes at least one driver mounted to the conduit(s) of the flowmeter. The driver mechanism typically contains one of many well known arrangements, such as, but not limited to, a voice coil where a magnet is mounted to one conduit and a wire coil is mounted to the other conduit in an opposing relationship to the magnet. A drive circuit continuously applies a periodic, typically sinusoidally or square shaped, drive signal to the driver coil. Through interaction of the continuous alternating magnetic field produced by the coil in response to the periodic drive signal and the constant magnetic field produced by the magnet, both flow conduits are initially forced to vibrate in an opposing sinusoidal pattern which is thereafter maintained. Those skilled in the art recognize that any device capable of converting an electrical signal to mechanical force is suitable for application as a driver. (See U.S. Pat. No. 4,777,833 issued to Carpenter and assigned on its face to Micro Motion, Inc.) Also, one need not use a sinusoidal signal but rather any periodic signal may be appropriate as the driver signal (see U.S. Pat. No. 5,009,109 issued to Kalotay et. al. and assigned on its face to Micro Motion, Inc.).

A typical mode, although not the only mode, in which Coriolis flowmeters are driven to vibrate is the first out-of-phase bending mode. The first out-of-phase bending mode is the fundamental bending mode at which the two tubes of a dual tube Coriolis flowmeter vibrate in opposition to one another. However, this is not the only mode of vibration present in the vibrating structure of a Coriolis flowmeter driven in the first out-of-phase bending mode. There are, of course, higher modes of vibration which may be excited. There is also, as a result of fluid flowing through the vibrating flow tube and the consequent Coriolis forces, a first out-of-phase twist mode that is excited as well as other modes. There are also in-phase and lateral modes of vibration. Ultimately, there are hundreds of vibration modes actually excited in a Coriolis flowmeter that is driven to oscillate in the first out-of-phase bending mode. Even within relatively narrow range of frequencies near the first out-of-phase bending mode there are at least several additional modes of vibration. In addition to multiple modes being excited by the driven excitation of the flow tubes, modes can be excited due to vibrations external to the flowmeter. For example, a pump located elsewhere in a process line might generate a vibration along a pipeline that excites a mode of vibration in a Coriolis flowmeter. Another reason that additional and undesirable modes are sometimes excited in a Coriolis flowmeter is when manufacturing tolerances are such that the driver elements are not located symmetrically on the flow tubes. This results in the driver putting eccentric forces into the flow tubes hence exciting multiple modes of vibration. Thus a Coriolis flowmeter driven to oscillate or resonate at the first out-of-phase bending mode actually has a conduit(s) oscillating in many other modes in addition to the first out-of-phase bending mode. Meters driven to oscillate in a different mode than the first out-of-phase bending mode experience the same phenomenon of multiple excited modes in addition to the intended drive mode.

Existing drive systems process a feedback signal, typically one of the pick-off sensor signals, to produce the drive signal. Unfortunately, the drive feedback signal contains responses from other modes in addition to the desired mode of excitation. Thus, the drive feedback signal is filtered through a frequency domain filter to remove unwanted components and the filtered signal is then amplified and applied to the driver. However, the frequency domain filter used to filter the drive feedback signal is not effective at isolating the single desired drive mode from other mode responses present in the drive feedback signal. There can be off-resonance responses from other modes which are near the desired mode resonance frequency. There might also be resonant responses at frequencies approaching the desired resonance frequency. In any event, the filtered drive feedback signal, i.e., the drive signal, typically contains modal content at frequencies other than just the desired mode for excitation of the flow tube. A drive signal composed of resonant response from multiple modes inputs, through the driver, energy to the flow tube that excites each mode for which the drive signal contains modal content. Such a multi-mode drive signal causes operational problems in Coriolis flowmeters. Further, frequency domain filters introduce phase lag in the filtered drive signal. This can result in a requirement for higher drive power to drive the flow tube at the desired amplitude.

One problem caused by a multi-mode drive signal is that external vibrations such as pipeline vibrations are reinforced by the drive signal. If pipeline vibrations external to the Coriolis flowmeter cause the flowmeter to vibrate, the drive feedback signal contains the response to the pipeline vibration. The frequency domain filter fails to remove the undesired response if the pipeline vibration falls at least in part within the frequency pass band of the filter. The filtered drive feedback signal, including the undesired response to the pipeline vibration, is amplified and applied to the driver. The driver then operates to reinforce the excitation mode of the pipeline vibration.

An additional problem of a drive signal having modal content at multiple frequencies occurs with respect to the density measurement made by a Coriolis mass flowmeter. The density measurement in a Coriolis flowmeter or vibrating tube densitometer relies on the measurement of the resonant frequency of the vibrating flow tube. A problem arises when the flow tube is driven in response to a drive signal containing modal content at multiple modes. The superposition of the multiple modes in the drive signal can result in a flow tube that is driven off-resonance from the true resonant frequency of the desired drive mode. An error in the density measurement can result.

The above-noted problems describe various conditions under which a drive signal intended to excite a single mode is degraded so that it excites multiple modes. Co-pending application Ser. No. 08/890,785 (the '785 application) filed Jul. 11, 1997, by applicant Timothy J. Cunningham (now U.S. Pat. No. 6,199,022), teaches the use of a modal filter to produce a drive signal from at least two feedback signals where the modally-filtered drive signal has modal content at only the desired mode of vibration. A modal filter is used to enhance a desired drive mode and suppress one or more undesired modes. The '785 application teaches, for the first time, a drive system that produces a drive signal having modal content only at the desired drive mode.

There are situations where one wants to excite multiple modes and thus a drive signal having modal content at multiple modes is required. See for example, U.S. Pat. No. 5,734,112 to assignee Micro Motion, Inc., where two modes are excited and changes in the ratio of the resonant frequencies of the two excited modes are related to fluid pressure within the vibrating conduit. Simultaneous excitation of two modes requires a drive signal having modal content at those two modes. There may be other reasons for driving a vibrating conduit such that multiple modes are excited and multiple modes are suppressed. U.S. Pat. No. 6,092,429 teaches a superposition in the temporal domain of one drive signal having a modal content at a first mode and a second drive signal having modal content at a second mode to produce a dual-mode drive signal. U.S. Pat. No. 6,092,429 also teaches the optimum location of drivers on a vibrating flowtube such that undesired modes are not excited and particularly teaches the advantages of multiple drivers. There are no existing drive control systems for producing drive signals having desired modal content at multiple modes or for producing modally-filtered drive signals to multiple drivers.

There exists a need for a drive control system that is easily adaptable to process a plurality of drive feedback signals to produce a plurality of drive signals each of which has modal content that influences multiple modes.

STATEMENT OF THE SOLUTION

The above identified problems, and others, are solved and a technical advance achieved in the field by the generalized modal space drive control system of the present invention.

The present invention provides a generalized drive control system that operates in the modal domain to produce a drive signal or signals for one or more drivers on a vibrating structure. The drive system receives multiple drive feedback signals, decomposes the modal content of the vibrating conduit into Single-Degree-Of-Freedom (SDOF) modal response signals, processes the SDOF modal response signals to select the desired amounts of each mode, and transforms the results to the physical domain for application to the driver(s). Thus, using the generalized drive control system of the present invention, one or more drive signals are produced to excite one or more drivers thereby exciting or suppressing certain modes on the vibrating structure. In addition, the drive control system of the present invention operates in, and easily switches between, multiple operating configurations. For example, one set of drive signals is generated by the present invention during a flow measurement operating configuration and an alternative set of drive signals is generated by the present invention during an axial stress measurement operating configuration.

The drive control system of the present invention is used to control the vibration modes of a vibrating structure that includes at least one vibrating conduit. The vibrating structure might also include additional vibrating conduits or one or more balance bars that are not wetted by the fluid to be measured by the flowmeter. Also, the vibrating structure might include flanges or cases, for example. Feedback sensors and drivers are placed on any portion(s) of the vibrating structure, according to the present invention, to bring about the excitation of desired modes and the suppression of undesired modes.

In one embodiment of the present invention, at least one feedback sensor provides a motion signal indicative of the movement of the vibrating conduit. The motion signal has modal content at multiple modes each of which is associated with a certain frequency. Multiple frequency bandpass filters produce multiple modal response signals. Each modal response signal is associated with one of the modes of vibration present on the vibrating conduit. In another embodiment of the present invention, at least two feedback sensors provide motion signals indicative of the movement of the vibrating conduit. The motion signals have modal content at a plurality of vibration modes. The motion signals are input to a multi-channel modal filter having a channel for a every mode to be influenced, i.e., excited or suppressed, by the drive control system. Each channel of the modal filter produces a modal response signal corresponding to one of the plurality of vibration modes at which the conduit vibrates. A drive controller having a channel for each modal response signal operates to produce a modal excitation signal corresponding to each vibration mode. The modal excitation signal corresponding to a given vibration mode indicates the extent to which the given mode is present in the final drive signal(s). A modal-to-physical force projector receives the modal excitation signals, transforms them to the physical domain and outputs one or more drive signals for application to one or more drivers. A further embodiment of the present invention utilizes frequency bandpass or other temporal filters in addition to modal filters in order generate modal response signals for further processing. In a further embodiment of the present invention, a combination of frequency band-pass filters and modal filters are used. The single output from each modal filter channel is passed through a frequency domain filter.

The modal filter of the present invention is comprised of a channel for each vibration mode influenced by the drive system. A modal response signal that is a substantially SDOF signal is produced for each vibration that is influenced by the drive system of the present invention. The configuration of the modal filter channels, once set, need not be reconfigured even when the drive system switches from a first operating configuration to a second operating configuration. Likewise, the modal-to-physical force projector is configured according to various methods disclosed herein and need not be reconfigured even when the drive system switches from a first operating configuration to a second operating configuration.

Each channel of the drive controller receives an input of one of the SDOF modal response signals. The modal response signal is compared to a modal response setpoint to produce a mode error signal. The mode error signal is amplified by a gain stage to produce a modal excitation signal for each mode influenced by the drive system of the present invention. The relative amplitude of the modal excitation signals corresponding to each influenced vibration mode indicates the extent to which a given mode contributes to the drive signal(s) produced by the present drive system. For example, if a given vibration mode, an "undesired" mode, is to be suppressed, then the modal response setpoint for the corresponding modal response signal is zero. The resulting modal excitation signal is transformed to the physical domain, i.e., an applied force, by operation of the modal-to-physical force projector. The force is applied to the vibrating tube to suppress the undesired mode.

The drive system of the present invention provides for multiple operating configurations. Thus, a Coriolis flowmeter, for example, utilizing the drive system of the present invention can alternate between various operating configurations each of which requires a different drive methodology. Consider the following example. In a first operating configuration, a certain vibration mode may be undesirable and therefore suppressed by the drive system of the present invention. However, in a second operating configuration, the same vibration mode may be desirable and therefore enhanced by the drive system of the present invention. The only changes to the drive system of the present invention from one operating configuration to another operating configuration are the modal response setpoint for each channel of the drive controller. A look-up table contains the appropriate setpoints for the various operating configurations of a given Coriolis flowmeter or vibrating densimeter.

The drive system of the present invention transforms multiple motion signals from the temporal domain to the modal domain. In the modal domain, the motion signals are decomposed into a SDOF modal response signal for each vibration mode to be influenced by the drive system. Each modal response signal is processed to produce a corresponding modal excitation signal. The modal excitation signal represents the magnitude of the corresponding vibration mode that is applied as a component of the drive signal(s) to bring about the desired modal response setpoint. The modal excitation signals are transformed from the modal domain to the temporal domain to produce a drive signal(s) that results in a force applied to a driver(s).

DETAILED DESCRIPTION OF THE INVENTION

Figure 1:
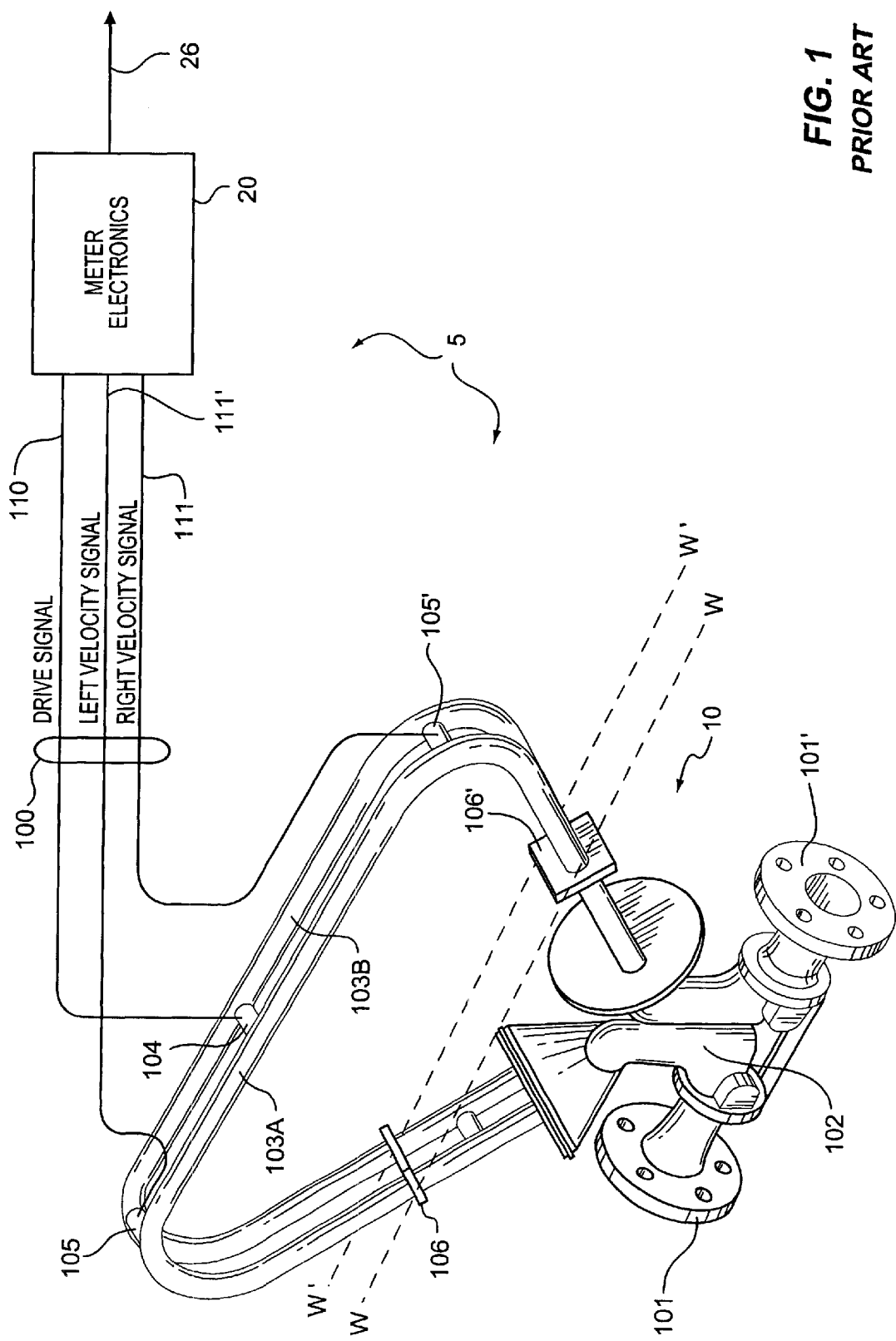
FIG. 1 depicts a Coriolis flowmeter and associated meter electronics in the prior art.

Coriolis Flowmeter in General—FIG. 1

FIG. 1 shows a Coriolis flowmeter 5 comprising a Coriolis meter assembly 10 and meter electronics 20. Meter electronics 20 is connected to meter assembly 10 via leads 100 to provide density, mass flow rate, volume flow rate, totalized mass flow and other information over path 26. A Coriolis flowmeter structure is described although it is apparent to those skilled in the art that the present invention could be practiced in conjunction with a vibrating tube densitometer without the additional measurement capability provided by a Coriolis mass flowmeter. In addition, the present invention can be applied to a Coriolis flowmeter or densitometer using more than a single driver or more than two pick-off sensors.

Meter assembly 10 includes a pair of flanges 101 and 101', manifold 102 and flow tubes 103A and 103B. Connected to flow tubes 103A and 103B are driver 104 and pick-off sensors 105 and 105'. Brace bars 106 and 106' serve to define the axis W and W' about which each flow tube oscillates.

When flowmeter 10 is inserted into a pipeline system (not shown) which carries the process material that is being measured, material enters meter assembly 10 through flange 101, passes through manifold 102 where the material is directed to enter flow tubes 103A and 103B, flows through flow tubes 103A and 103B and back into manifold 102 from where it exits meter assembly 10 through flange 101'.

Flow tubes 103A and 103B are selected and appropriately mounted to the manifold 102 so as to have substantially the same mass distribution, moments of inertia and elastic modules about bending axes W—W and W'-W', respectively. The flow tubes extend outwardly from the manifold in an essentially parallel fashion.

Flow tubes 103A–103B are driven by driver 104 in opposite directions about their respective bending axes W and W' and at what is termed the first out of phase bending mode of the flowmeter. Driver 104 may comprise any one of many well known arrangements, such as a magnet mounted to flow tube 103A and an opposing coil mounted to flow tube 103B and through which an alternating current is passed for vibrating both flow tubes. A suitable drive signal is applied by meter electronics 20, via lead 110, to driver 104. As noted above and described herein in more detail, the present invention is suitable for use with any number of drivers. The description of FIG. 1 is provided as merely an example of the operation of a Coriolis flowmeter and is not intended to limit the teaching of the present invention.

Meter electronics 20 receives the left and right velocity signals appearing on leads 111 and 111', respectively. Meter electronics 20 produces the drive signal appearing on lead 110 and causing driver 104 to vibrate tubes 103A and 103B. The present invention, as described herein, can produce multiple drive signals for multiple drivers. Meter electronics 20 processes the left and right velocity signals to compute the mass flow rate and the density of the material passing through meter assembly 10. This information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only single feedback signal since a density measurement requires only the measurement of frequency and a phase measurement is not necessary. The descriptions of the present invention herein apply equally to vibrating tube densitometers. Those skilled in the art recognize that where an existing Coriolis flowmeter already has two feedback signals available to input to a modal filter, an existing vibrating tube densitometer has only one feedback signal typically available. Thus one need only provide additional feedback signals in a vibrating tube densitometer in order to apply the present invention to a vibrating tube densitometer.

Figure 2:
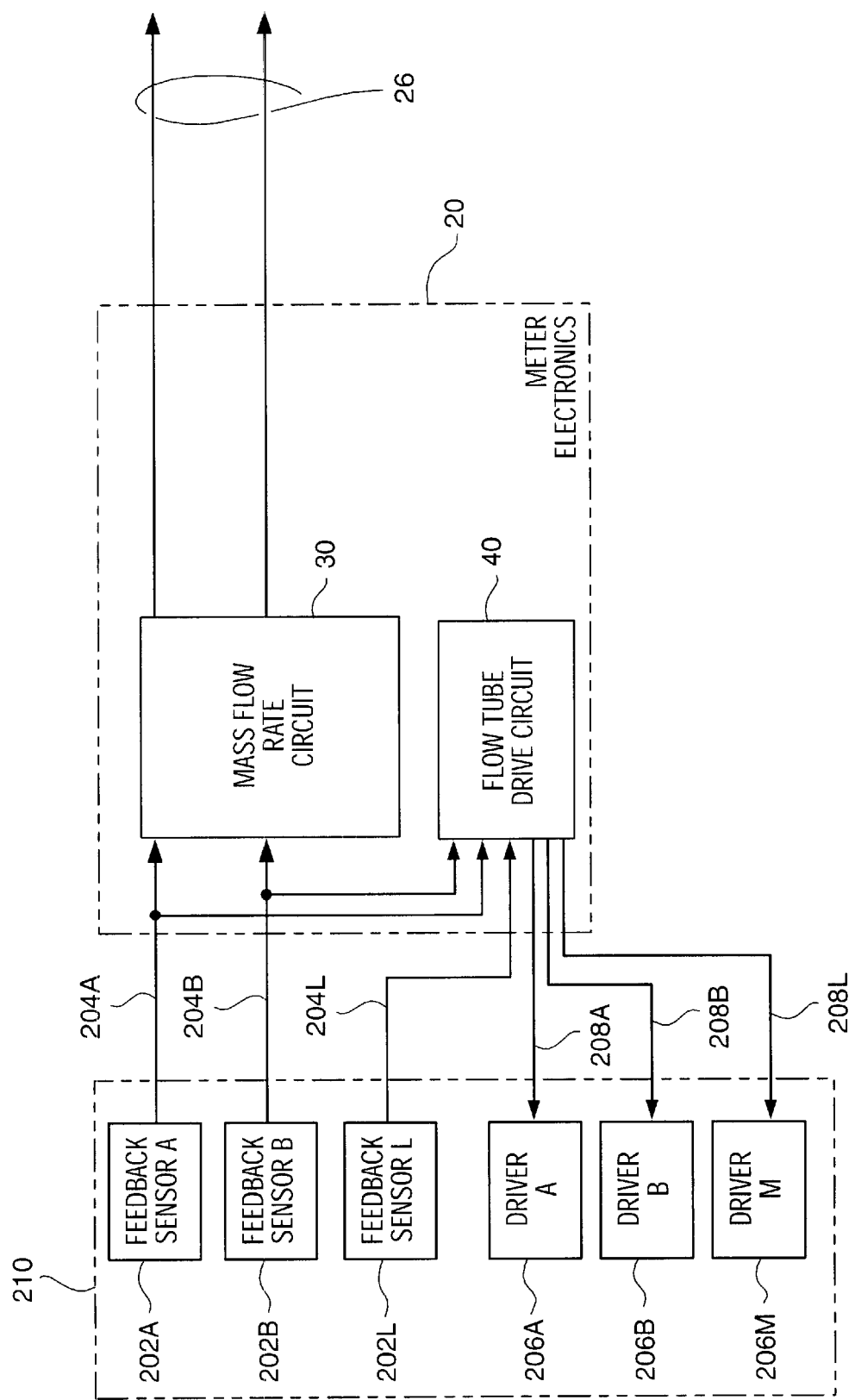
FIG. 2 depicts a block diagram of a generalized modal space drive control system according to the present invention.

Meter Electronics in General—FIG. 2

FIG. 2 depicts a block diagram of meter electronics 20 for a general case where there are L feedback sensors 202A–202L and M drivers 206A–206M. L and M are any integer values. Meter electronics 20 includes mass flow rate circuit 30, and drive circuit 40. Mass flow rate circuit 30 is one of many known circuits for calculating the mass flow rate of a fluid through a vibrating tube based on the difference in phase between two points on the vibrating tube. Typically two of feedback sensors 202A–202L are also used by mass flow rate circuit 30 to produce mass flow rate information although feedback sensors used by drive circuit 40 may be separate from feedback sensors used by mass flow rate circuit 30. Mass flow circuit 30 produces output to a utilization means (not shown) over line 26. The utilization means might be, for example, a display. The details of mass flow rate circuit 30 are well known to those skilled in the art and do not form part of the present invention. See U.S. Pat. No. RE 31,450 issued to Smith on Nov. 29, 1983 and assigned on its face to Micro Motion, Inc. or U.S. Pat. No. 4,879,911 issued to Zolock on Nov. 14, 1989 and assigned on its face to Micro Motion, Inc. or U.S. Pat. No. 5,231,884 issued to Zolock on Aug. 3, 1993 and assigned on its face to Micro Motion, Inc. for exemplary information regarding mass flow rate circuit 30.

Drive circuit 40 receives motion signals over paths 204A–204L from feedback sensors 202A–202L, respectively. Drive Circuit 40 generates M drive signals over paths 208A–208M to drivers 206A–206M, respectively. Operation of the present invention preferably utilizes at least two motion signals from at least two feedback sensors sensing the motion of two different points on a vibrating conduit. Operation of the present invention requires at least one driver. The remainder of the discussion herein focuses on the operation of drive circuit 40.

Figure 3:
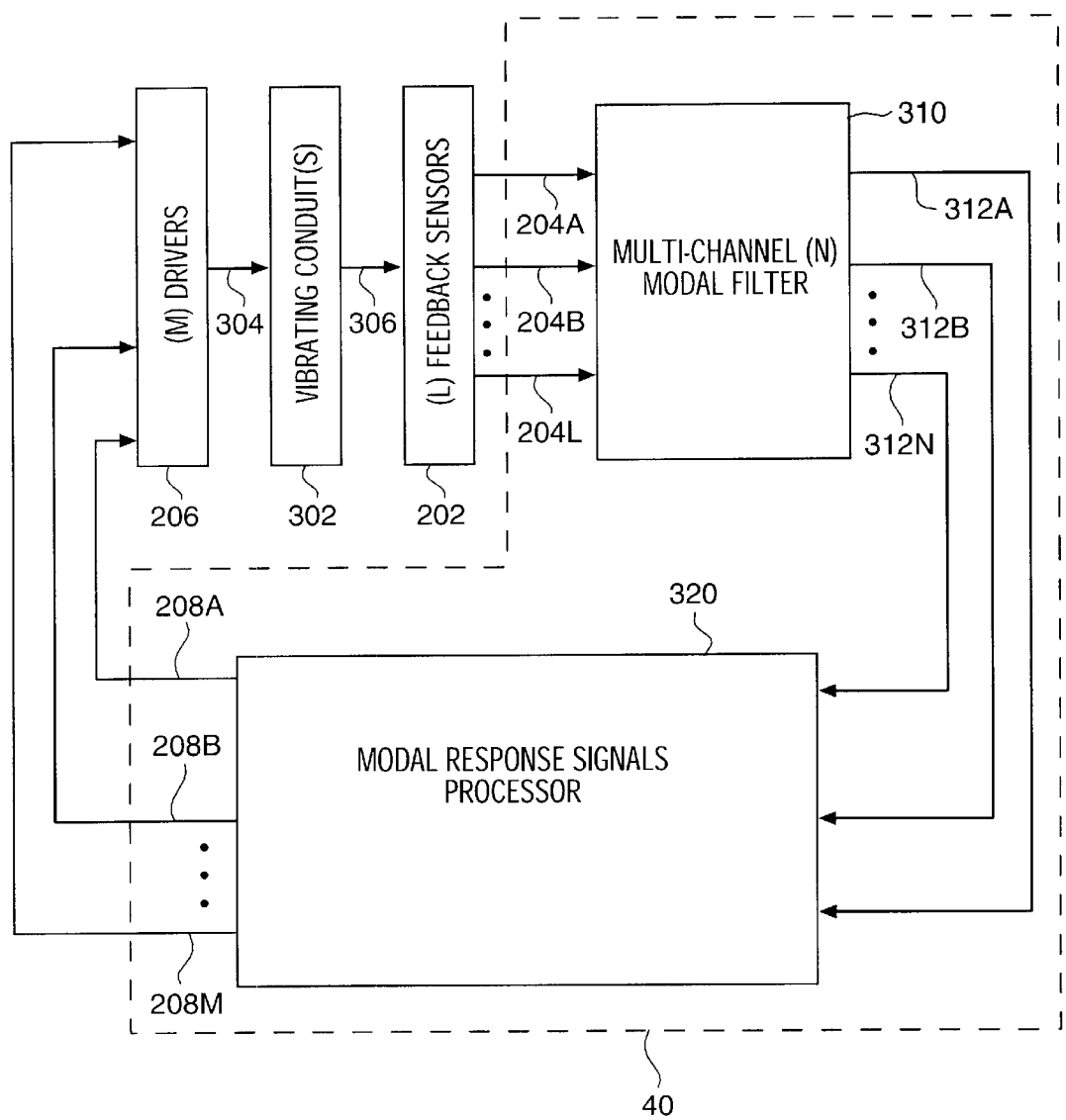
FIG. 3 depicts a block diagram of a drive circuit according to the present invention.
Figure 4:
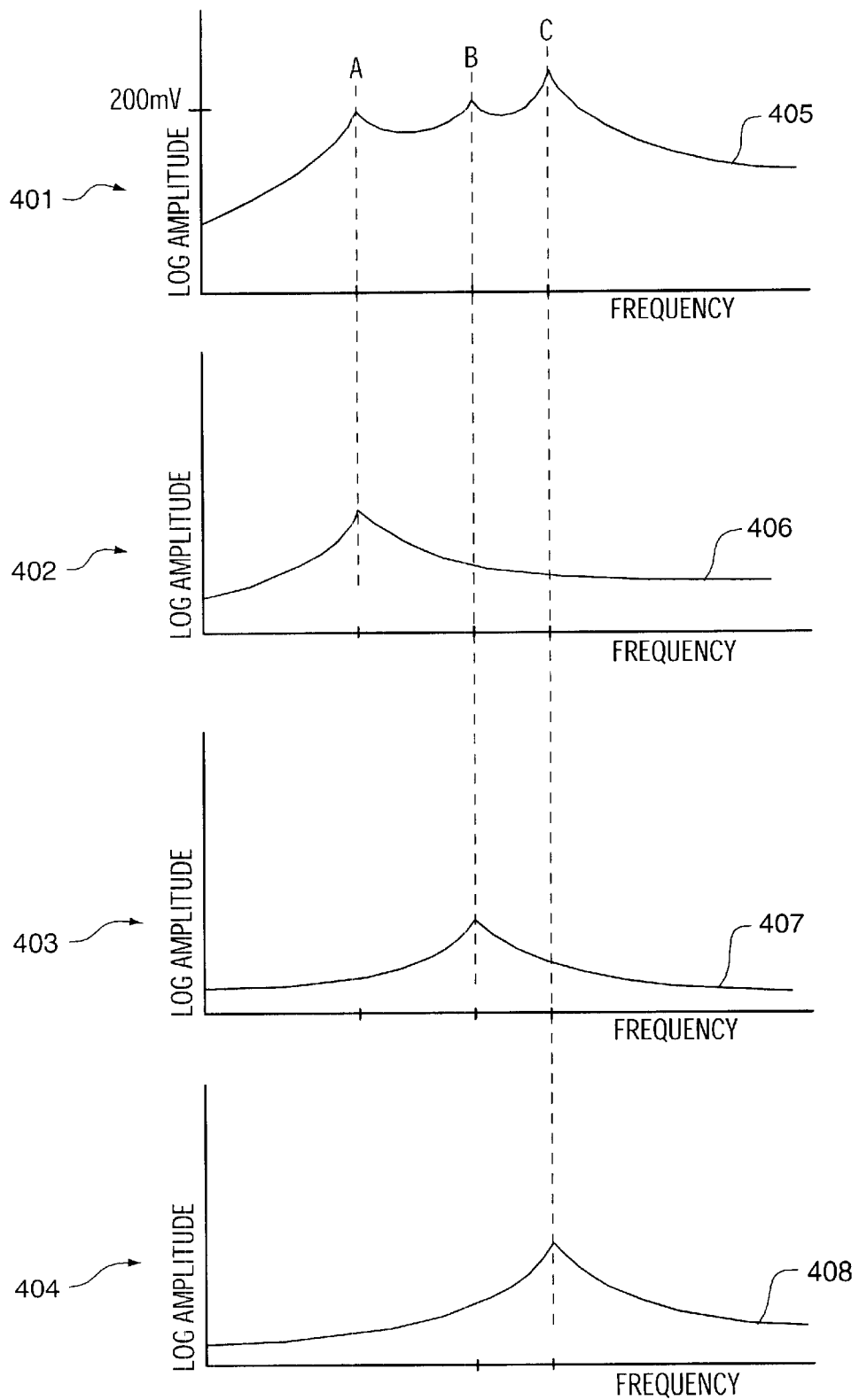
FIG. 4 depicts a frequency response function of a representative flow tube feedback signal and additional frequency response functions representing the contribution of constituent vibration modes to the feedback signal.

Modal Space Drive Controller in General—FIGS. 3–4

FIG. 3 depicts drive circuit 40 including multi-channel modal filter 310 and modal response signals processor 320. Vibrating conduit(s) 302 schematically represents conduits 103A–103B or any other single or multiple conduit geometry. As noted above, vibrating conduit(s) 302 may be part of a vibrating structure that includes other vibrating elements. Although this embodiment is described with respect to vibrating conduit(s) 302 as the total vibrating structure, it is understood, as noted above, that vibrating conduit(s) may comprise just a portion of a vibrating structure. Force 304 from drivers 206A–206M cause vibrating conduit(s) 302 to vibrate. As vibrating conduit(s) 302 vibrate, motion 306 is sensed by feedback sensors 202A–202L. Feedback sensors 202A–202L are located at different points on the vibrating structure, i.e., different points on vibrating conduit(s) 302, and produce motion signals over paths 204A–204L which are input to drive circuit 40.

The motion signals are input to multi-channel modal filter 310. Multi-channel modal filter 310 decomposes the modal content of the motion signals to produce N modal response signals over paths 312A–312N. FIG. 4 illustrates the operation of multi-channel modal filter 310. Graphs 401–404 have vertical axes representing the log ratio of conduit response amplitude over input force amplitude. Graph 401 illustrates Frequency Response Function (FRF) 405 for a vibrating conduit such as vibrating conduit(s) 302. A FRF characterizes the dynamics between a force applied to a structure at one location and the resulting motion of the structure at another location. Thus, FRF 405 is, for example, the FRF at the location of one of feedback sensors 202 on vibrating conduit(s) 302. FRF 405 has modal content at modes A, B and C within a certain frequency range. Each of the motion signals generated by feedback sensors 202A–202L has modal content similar to FRF 405. Multi-channel modal filter 310 operates to decompose the modal content of the motion signals to produce substantially Single Degree Of Freedom (SDOF) modal response signals over paths 312A–312N and having FRF's as illustrated in graphs 402–404. Graph 402 illustrates FRF 406 which corresponds to a modal response signal over path 312A for mode A or the first out-of-phase bend mode component of FRF 405. Graph 403 illustrates FRF 407 which corresponds to a modal response signal over path 312B, for mode B or the first out-of-phase twist mode component of FRF 405. Graph 404 illustrates FRF 408 which corresponds to a modal response signal over path 312N, for mode C or the second out-of-phase bend mode component of FRF 405. Thus, the input to multi-channel modal filter 310 is L motion signals over paths 204A–204L. The output from multi-channel modal filter 310 is N SDOF modal response signals over paths 312A–312N where each modal response signal represents the modal content of the vibrating conduit(s) 302 at a single mode. Multi-channel modal filter 310 can be configured to produce modal response signals for any modes present in the frequency range of interest.

The modal response signals are input to modal response signals processor 320. As described in more detail with respect to FIG. 6, modal response signals processor 320 processes modal response signals to produce M drive signals over paths 208A–208M. In the simplest case there is only one driver and therefore only one drive signal.

Figure 5:
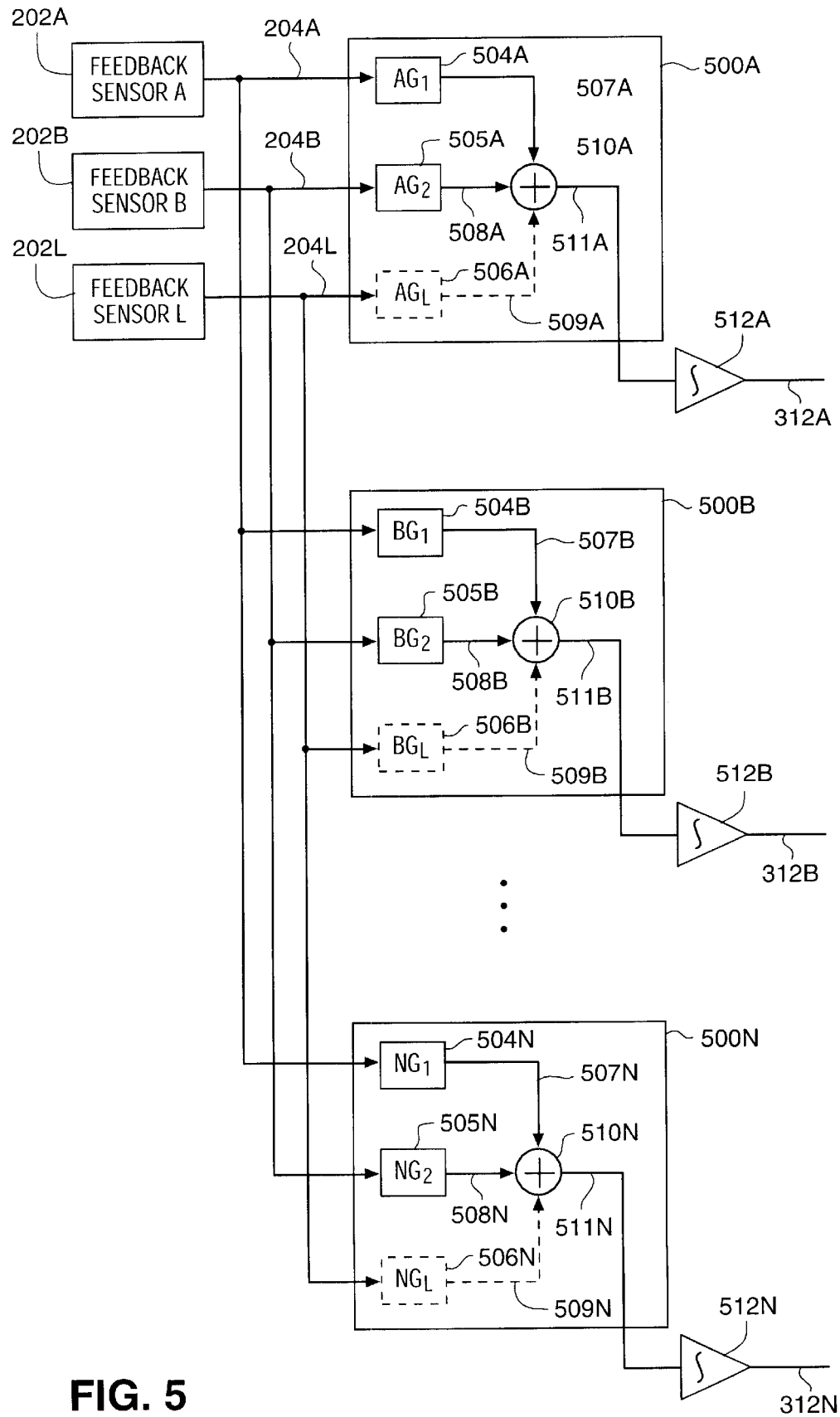
FIG. 5 depicts a block diagram of a multi-channel modal filter according to the present invention.

Multi-Channel Modal Filter—FIG. 5

FIG. 5 is a more detailed depiction of multi-channel modal filter 310. Multi-channel modal filter 310 is comprised of modal filter channels 500A–500N. Modal filter channels 500A–500N are identical but for the gains of their respective amplifiers 504A–504L, 505A–505L and 506A–506L. As described herein, the gains of the amplifiers in modal filter channels 500A–500N are set such that each modal filter channel 500A–500N outputs one modal response signal corresponding to one vibration mode present on vibrating conduit(s) 302. Only one of modal filter channels 500A–500N is described in detail since there is complete commonality between the configuration of multiple channels.

With reference to modal filter channel 500A, motion signals from feedback sensors 202A–202L are input to amplifiers 504A–506A, respectively. Amplifier 506A represents any number of additional amplifiers for receiving motion signals from any number of additional feedback sensors 202A–202L. Amplifier 504A has a gain of $AG_1$, amplifier 505A has a gain of $AG_2$ and amplifier 506A has a gain $AG_L$. Gains $AG_1$–$AG_L$ are referred to as the weighting factors applied by modal filter channel 500A to the motion signals over paths 204A–204L. The outputs of amplifiers 504A–506A over paths 507A–509A are referred to as the weighted feedback signals. The weighted feedback signals are summed by summer 510A to produce a SDOF modal response velocity signal over path 511A. The modal response velocity signal over path 511A is input to integrator 512A. Integrator 512A integrates the modal response velocity signal over path 511A to produce a modal response displacement signal over path 312A.

Figure 8:
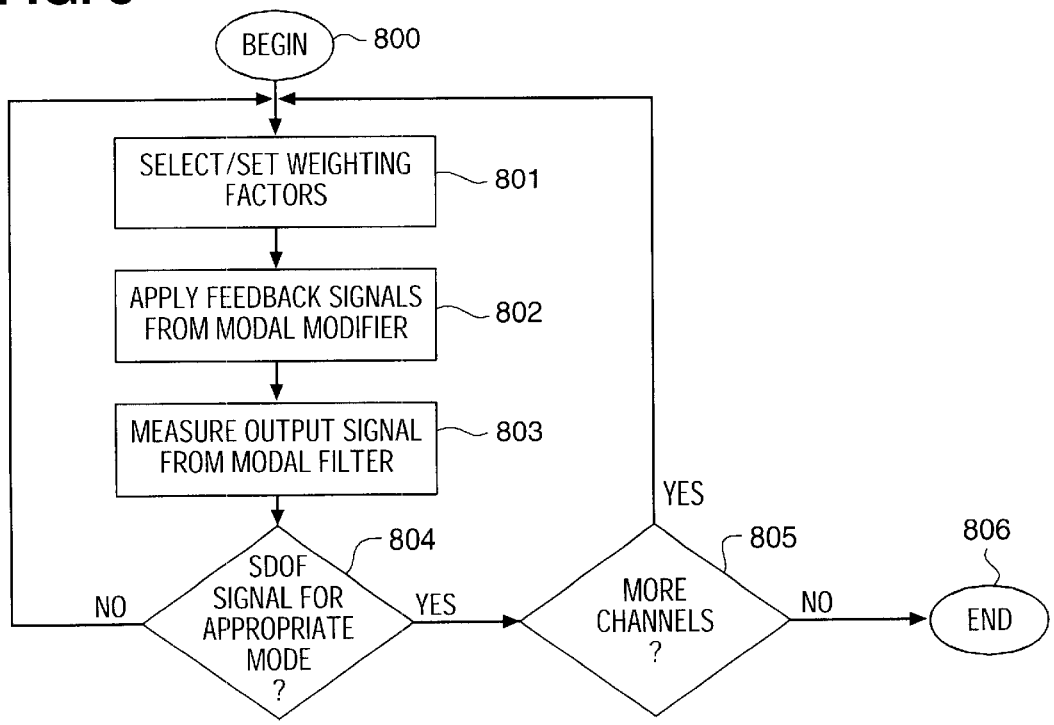
FIG. 8 is a flowchart illustrating the process steps for selecting modal filter weighting coefficients by trial and error.
Figure 9:
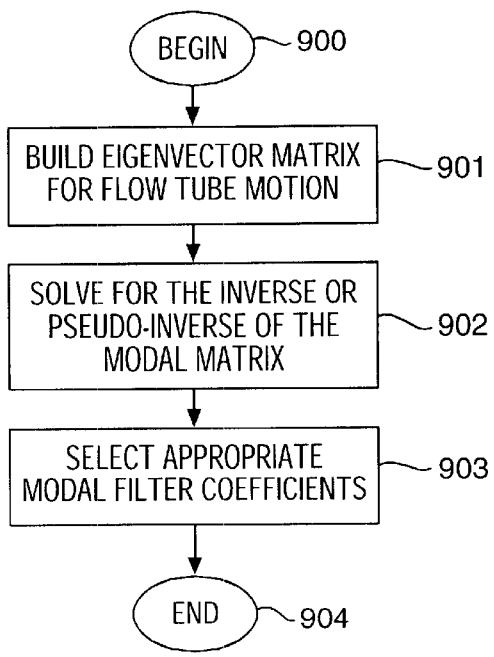
FIG. 9 is a flowchart illustrating the process for selecting modal filter weighting coefficients by calculating the inverse or pseudo-inverse of the eigenvector matrix.

Selection of Modal Filter Weighting Factors—FIGS. 8–9

Selection of the weighting factors for each channel of multi-channel modal filter 310 is discussed in more detail below with respect to FIGS. 8–9. There are a variety of methods one can use to select the weighting factors for the modal filter(s) applied to a drive circuit of a Coriolis mass flowmeter. The means by which the weighting factors are determined is not critical and any one method or combination of methods is suitable and equivalent.

One method of selecting the weighting factors for the modal filter(s) of a Coriolis drive circuit is trial and error. As noted with respect to FIGS. 3–5, the desired result of multi-channel modal filter 310 is to produce SDOF modal response signals corresponding to the vibration modes present on vibrating conduit(s) 302. FIG. 8 is a flow chart illustrating the steps one uses to select modal filter weighting coefficients for a single channel of multi-channel modal filter 310 using a trial and error approach. Steps 801–804 are repeated until the appropriate SDOF modal response signal is obtained as an output from, for example, channel 500A. Steps 801–804 are conducted using an actual Coriolis flowmeter, properly instrumented to provide the necessary feedback signals along with a drive circuit that allows the changing of the gains of the modal filter amplifiers. Alternatively, the feedback signals can be recorded, for example in a Digital Audio Tape format, and re-applied to the modal filter drive circuit with each pass through steps 801–804. Alternatively, steps 801–804 are executed using a numerical model of a Coriolis flowmeter and associated drive circuit.

The process begins with step 800 and continues to step 801 where a first set of weighting coefficients are selected. During step 801, one can select a complete new set of weighting coefficients (gains $AG_1$–$AG_N$, in the case of channel 500A) each time step 801 is executed or one can select a new weighting coefficient for just one feedback signal each time step 801 is executed. During step 802 the feedback signals are applied to the channel 500A where each modal filter amplifier has the gain set as determined by step 801. During step 803 the filter output signal is measured and recorded. Processing continues from step 803 to decision block 804.

Decision block 804 operates to determine if the filter channel output signal is a SDOF modal response signal for the appropriate vibration mode. If it is determined, by operation of decision block 804, that the signal output by the filter channel is substantially a SDOF modal response signal for the desired vibration mode, then processing continues to decision block 805 where it is determined if there are more channels in the multi-channel filter for which weighting coefficients are required. If it is determined that the signal output by the filter channel is not substantially a SDOF modal response signal for the desired vibration mode, then processing returns to step 801. A new set of weighting coefficients is selected during step 801 and steps 802–804 are processed again to locate a set of weighting coefficients that produce a SDOF modal response signal. This process is repeated for each of channels 500A–500N, by operation of decision block 805, until each of channels 500A–500N produces a SDOF modal response signal corresponding to one vibration mode.

Another method of selecting the weighting coefficients for each channel of multi-channel modal filter 310 is to calculate the inverse or pseudo-inverse of the eigenvector matrix. As noted above, a vibrating flow tube of a Coriolis flowmeter has present a combination of vibration modes. Analyzing the flow tube motion in physical coordinates, e.g. the singular response at individual points and directions on the flow tube, requires the analysis of coupled equations which do not easily yield useful information about the motion of the flow tube. However, one can use a modal transformation to transform a vector of physical responses to the modal responses or modal coordinates of the system. The standard modal transformation is given by:

$$x = \Phi \eta \quad (1)$$

where:

x is the vector of physical response coordinates $\Phi$ is the eigenvector matrix, the columns of which are the flow tube eigenvectors (also referred to as modal vectors) of interest, and $\eta$ is the vector of modal response coordinates. The eigenvector matrix can, as described below, be developed for any Coriolis flowmeter flow tube. The physical vectors can be thought of as the input, i.e. the feedback signals, to the modal filter. Therefore equation (1) is solved for $\eta$, the modal coordinate response(s) as follows:

$$\eta = \Phi' x \quad (2)$$

Putting equation (1) in the form of equation (2) requires taking the pseudo-inverse of the eigenvector matrix $\Phi$. If the eigenvector matrix is square and non-singular then the inverse of the eigenvector matrix ($\Phi^{-1}$) is used in Equation (2) rather than the pseudo-inverse. The eigenvector matrix is square and non-singular when the number of feedback signals from the flow tube equals the number of modes considered and the modal vectors are linearly independent.

The following example is utilized to illustrate the process by which one calculates the pseudo-inverse of a modal matrix to determine the weighting coefficients for one channel of a multi-channel modal filter modal filter. One could use a physical or a numerical model of the flowmeter to build the eigenvector matrix. In the following example a numerical model of the flowmeter is used.

A finite element model is built of the tubes of a CMF100 model Coriolis mass flowmeter (manufactured by Micro Motion, Inc. of Boulder, Colo.). The model fixes to ground the ends of the flow tubes that, on a physical flowmeter, connect to the flowmeter manifold. Finite element modeling techniques are well known to those skilled in the art and do not form part of the present invention. The exemplary finite element model was built using SDRC-Ideas and analyzed by MSC/NASTRAN, a finite element code available from MacNeal-Schwendler. Those skilled in the finite element modeling art recognize that any finite element code could alternatively be used. The locations of the feedback sensors were modeled to produce output representative of the relative motion between the locations on the flow tube of the magnet and coil corresponding to the right pick-off, the drive and the left pick-off. These "scalar points" are a standard technique in advanced dynamic analysis. See "A Finite Element for the Vibration Analysis of a Fluid-Conveying Timeshenko Beam.". (AIAA Paper 93-1552), for more information on finite element modeling of Coriolis flowmeters.

The eigenvalue coefficients of the CMF100 model are extracted from the finite element model to build the following 3 row by 10 column eigenvector matrix for the CMF100 sensor:

$$\phi_{full} = \begin{pmatrix} 0 & 25.08 & 0 & 0 & 0 & -40.3 & 0 & 0 & 0 & 36.78 \\ 0 & 35.39 & 0 & 0 & 0 & 0 & 0 & 0 & 0 & -36.55 \\ 0 & 25.08 & 0 & 0 & 0 & 40.3 & 0 & 0 & 0 & 36.78 \end{pmatrix} \quad (3)$$

Each row in the full eigenvector matrix $\Phi_{full}$ of equation (3) corresponds to a physical location on the flow tube. The first row corresponds to the left pick-off location, the second row corresponds to the driver location and the third row corresponds to the right pick-off location. Each column in the full eigenvector matrix $\Phi_{full}$ corresponds to a mode of vibration. This matrix is used in a known fashion by the finite element model to model the signals generated by the pick-off sensors. The matrix is used, as described below, to develop the weighting coefficients for each channel of the drive circuit modal filter. The columns (modes) with zeroes in the full eigenvector matrix $\Phi_{full}$ are "in-phase modes". This means that there is no relative motion between the tubes because both tubes are moving with the same speed and direction. Thus, the sensors used to provide feedback signals, velocity sensors in this example, themselves act as a kind of modal filter by filtering out all the in-phase modes. The full eigenvector matrix $\Phi_{full}$ is reduced by removing all the in-phase columns.

$$\phi_{reduced} = \begin{pmatrix} 25.1 & -40.3 & 36.8 \\ 35.4 & 0 & -36.6 \\ 25.1 & 40.3 & 36.8 \end{pmatrix} \quad (4)$$

Equation (4) is the reduced eigenvector matrix $\Phi_{reduced}$. Equation (1), the standard modal transformation, is rewritten using the reduced eigenvector matrix $\Phi_{reduced}$ as follows:

$$\begin{pmatrix} FSA \\ FSB \\ FSL \end{pmatrix} = \begin{pmatrix} 25.1 & -40.3 & 36.8 \\ 35.4 & 0 & -36.6 \\ 25.1 & 40.3 & 36.8 \end{pmatrix} \cdot \begin{pmatrix} \eta_b \\ \eta_t \\ \eta_{2b} \end{pmatrix} \quad (5)$$

where $\eta_b$ is the first out-of-phase bend mode modal coordinate response, $\eta_t$ is the first out-of-phase twist mode modal coordinate response and $\eta_{2b}$ is the second out-of-phase bend mode modal coordinate response and FSA is the physical response from Feedback Sensor A, FSB is the physical response from Feedback Sensor B and FSL is the physical response from Feedback Sensor L. If the pickoff responses and reduced eigenvector matrix are known, the modal coordinate responses can be determined as in (6) by premultiplying Equation (5) by the inverse or psuedo-inverse of the reduced eigenvector matrix.

$$\begin{pmatrix} \eta_b \\ \eta_t \\ \eta_{2b} \end{pmatrix} = \begin{pmatrix} 25.1 & -40.3 & 36.8 \\ 35.4 & 0 & -36.6 \\ 25.1 & 40.3 & 36.8 \end{pmatrix}^{-1} \cdot \begin{pmatrix} FSA \\ FSB \\ FSL \end{pmatrix} \quad (6)$$

The reduced eigenvector matrix is inverted by importing the matrix into a standard, commercial mathematical computation package such as Mathcad and utilizing one of the standard inversion or pseudo-inversion functions available in these computing packages. The resulting equation is shown as equation (7):

$$\begin{pmatrix} \eta_b \\ \eta_t \\ \eta_{2b} \end{pmatrix} = \quad (7)$$

$$\begin{pmatrix} 8.23892 \cdot 10^{-3} & 1.657905 \cdot 10^{-2} & 8.23892 \cdot 10^{-3} \\ -1.240777 \cdot 10^{-2} & 0 & 1.240777 \cdot 10^{-2} \\ 7.975764 \cdot 10^{-3} & 1.130755 \cdot 10^{-2} & 7.975763 \cdot 10^{-3} \end{pmatrix} \cdot \begin{pmatrix} FSA \\ FSB \\ FSL \end{pmatrix}$$

The numerical coefficients in Equation (7) are the weighting factors for the modal filter amplifiers in a Coriolis flowmeter drive circuit. For example, if one desires to extract the first out-of-phase bend mode from the feedback signals, as is the case for channel 500A, then the first row of the above modal filter vector matrix is used as follows:

$$\eta_b = 8.2389(FSA) + 16.5795(FSB) + 8.2389(FSL) \quad (8)$$

The first out-of-phase bend mode modal vector coefficients were multiplied by $10^3$ to simplify Equation (8). With reference to channel 500A of FIG. 5, gain $AG_1$ of amplifier 504A is set to 8.2389 (the modal filter vector coefficient corresponding to Feedback Sensor A), gain $AG_2$ is set to 8.2389 (the modal filter vector coefficient corresponding to Feedback sensor B) and gain $AG_L$ is set to 16.5795 (the modal filter vector coefficient corresponding to Feedback Sensor L). Likewise the coefficients from the second and third rows of Equation 7 are used as the weighing coefficients for channels 500B–N, respectively. Thus each of channels 500A–N produces a SDOF modal response signal corresponding to one vibration mode present on vibrating conduits 302. The weighting factors are linearly scaled as a group to provide a modal response signal over path 312A having the proper amplitude for input into modal response signals processor 320.

FIG. 9 is a flowchart illustrating the process steps for determining the drive circuit modal filter coefficients by calculating the inverse or pseudo-inverse of the eigenvector matrix. Calculation of the inverse or pseudo-inverse of the eigenvector matrix described above and with respect to FIG. 9 is known to those skilled in the art of advanced dynamic analysis and is a useful tool for determining the drive circuit modal filter coefficients. The flowchart of FIG. 9 begins with element 900 and proceeds to step 901. During step 901 the eigenvector matrix is built. As noted above, a method of determining the eigenvectors for the eigenvector matrix is by building a finite element model of the flowmeter from which the eigenvectors are extracted. Another approach is to use experimental modal analysis to determine the eigenvectors directly from a physical sample of the flowmeter. Experimental modal analysis is well known to those skilled in the art and its methods and use to not form part of the present invention. Once the eigenvectors are obtained by any appropriate method, the eigenvector matrix is compiled. Equation (3) is an example of a full eigenvector matrix for 10 modes of vibration at three points on the flow tubes. Each column of the eigenvector matrix represents a different mode while the number of rows of the eigenvector matrix represents degrees of freedom. The eigenvector matrix is then reduced to the modes to be filtered. For the current example this is done by eliminating the columns with 0's as coefficients. For the exemplary structure and sensors described herein, the columns (modes) with coefficients as 0's are in-phase modes. Processing proceeds from step 901 to step 902.

During step 902 the inverse or pseudo-inverse of the eigenvector matrix is calculated. Each row of the inverse or pseudo-inverse of the eigenvector matrix contains the modal filter coefficients associated with a particular mode. This is expressed in general by Equation (2) and is shown for the above example by Equation (7). Processing next proceeds to step 903.

During step 903 the appropriate modal filter weighting coefficients are selected, as described above, to produce a different SDOF modal response signal from each channel of the multi-channel modal filter.

Figure 12:
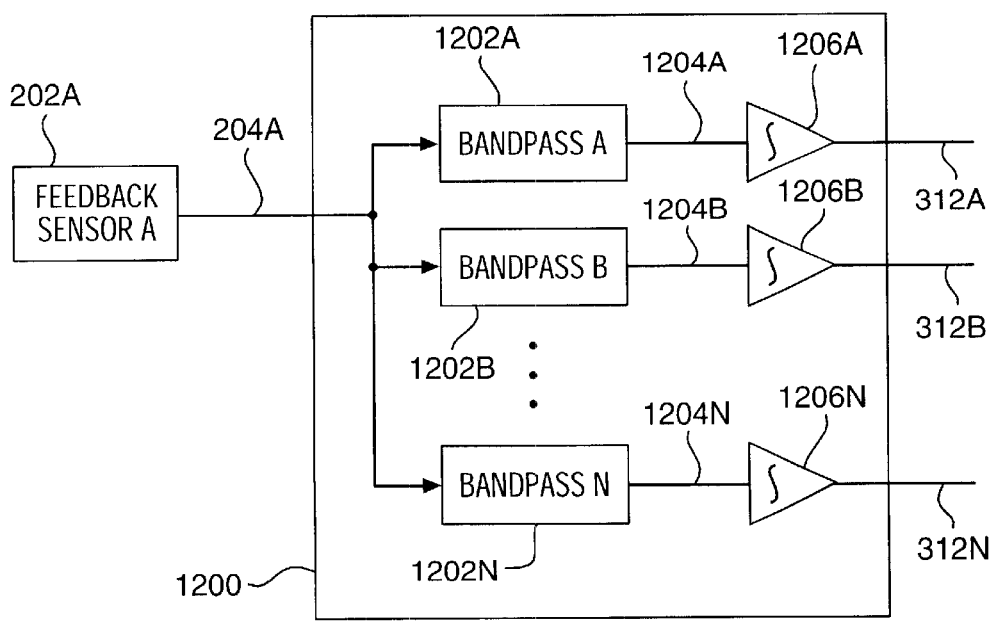
FIG. 12 depicts a modal response signal generator according to the present invention.

Modal Response Signals Generator—FIG. 12

FIG. 12 depicts modal response signals generator 1200. Modal response signals generator 1200 is an alternative to multi-channel modal filter 310 for producing modal response signals over paths 312A–312N. Modal response signals generator 1200 uses frequency bandpass filters 1202A–1202N to decompose a single motion signal, from feedback sensor A in this example, into modal response signals where each modal response signal corresponds to a mode of vibration present on vibrating conduit(s) 302. With reference to FIGS. 12 and 4, bandpass filter 1202A is configured to pass frequency A shown in FIG. 4. Likewise bandpass filter 1202B is configured to pass frequency B and bandpass filter 1202N is configured to pass frequency C. Integrators 1206A–1206-N integrate the bandpass filtered signals over paths 1204A–1204N to produce displacement signals from the velocity signal output by feedback sensor A. Those skilled in the art of temporal-domain filters recognize that any one of a number of different filtering techniques could be used in bandpass filters 1202A–1202N including, but not limited to, digital signal processing techniques.

In a further embodiment of the present invention, the bandpass filters of FIG. 12 are used in conjunction with the multi-channel modal filter of FIG. 5. For example, bandpass filter is 1202A applied to the output of amplifier 504A, bandpass filter 1202B is applied to the output of amplifier 505A and band pass filter 1202N is applied to the output of amplifier 506A.

Figure 6:
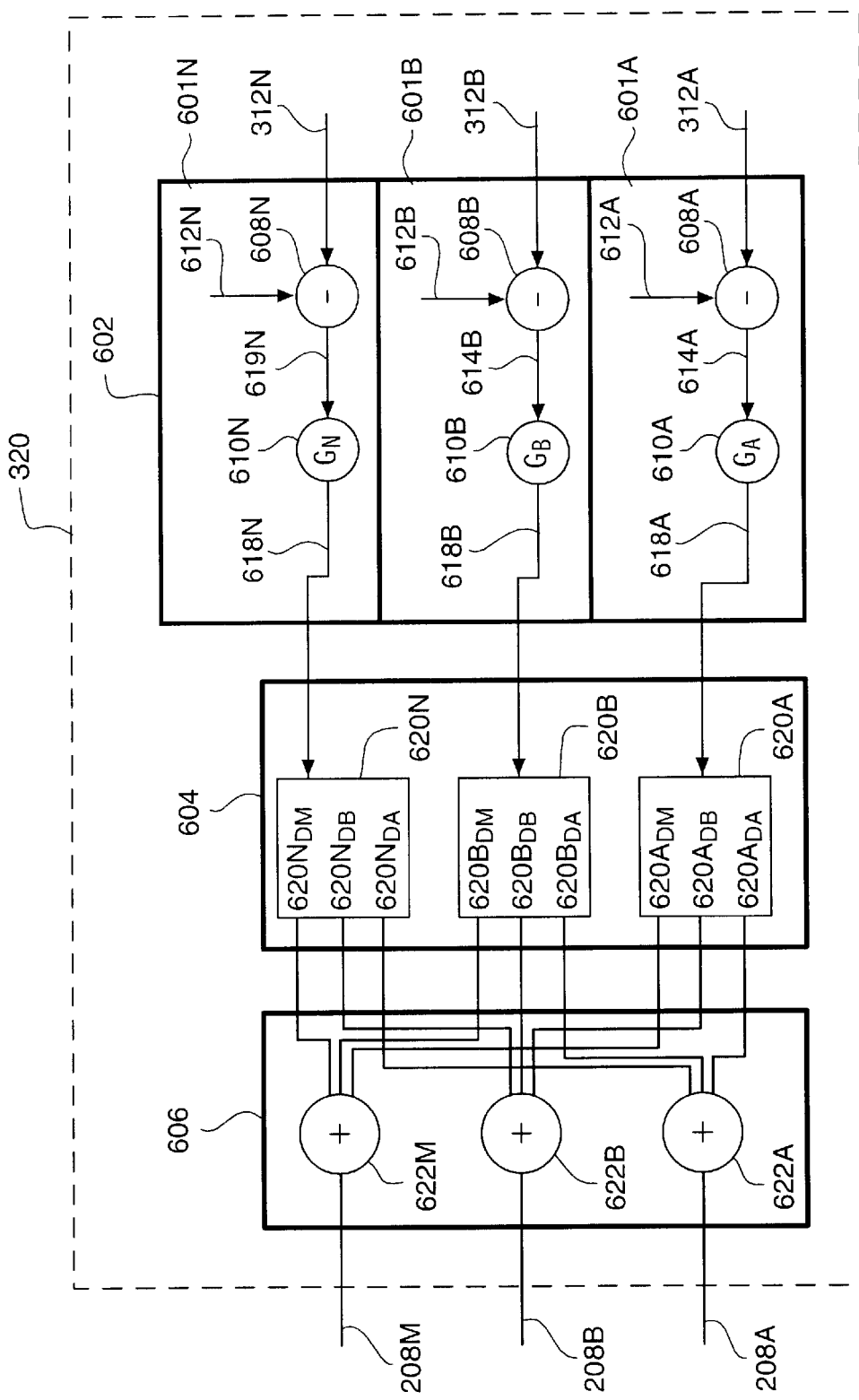
FIG. 6 depicts a modal response signals processor according to the present invention.

Modal Response Signals Processor—In General—FIG. 6

Multi-channel modal filter 310, or alternatively modal response signals generator 1200, produces N modal response signals, as just described, over paths 312A–312N. Circuit paths 312A–312N are input to modal response signals processor 320. Modal response signals processor 320 processes the N modal response signals to produce M drive signals over paths 208A–M.

FIG. 6 depicts a block diagram of modal response signals processor 320. Modal response signals processor includes drive controller 602, modal-to-physical force projector 604 and summer stage 606. In general, drive controller 602 receives the N modal response signals over paths 312A–312N and, for each modal response signal, determines the deviation of the modal response signal from a desired setpoint for the modal response signal. This deviation or "mode error signal" is amplified by amplifiers 610A–610N with a modal gain ($G_A$–$G_N$) to produce a modal excitation signal that, when applied through driver(s) 206A–206M to vibrating conduit(s) 302, modifies the modal content of vibrating conduit(s) 302 so that the resultant modal response signals approach their corresponding desired modal setpoints. The modal excitation signals are communicated from drive controller 602 to modal-to-physical force projector 604 over paths 618A–618N.

The modal excitation signals over paths 618A–618N represent, in the modal domain, excitations to be applied to vibrating conduit(s) 302. However, vibrating conduit(s) 302 are, of course, in the physical domain and therefore the modal excitation signals must be converted to the required physical excitations, or forces. This transformation is accomplished by modal-to-physical force projector 604. Modal-to-physical force projector 604 is comprised of a separate channel 620A–620N for each modal response signal. There is one output from each channel 620A–620N for each one of driver(s) 206A–206M.

The outputs from modal-to-physical force projector 604 are fed to summer stage 606. The outputs from modal-to-physical force projector 604 are summed, as described in more detail below, to produce M drive signals over paths 208A–208M.

Driver Controller—FIG. 6

Drive controller 602 is comprised of one channel 601A–601N for each of the N modal response signals. The function and operation of each channel 601A–601N is similar and therefore only one of channels 601A–601N is described in detail. The operation of the remaining channels is clear from the following description of channel 601A. Description of drive controller 602 is organized into a first discussion of the modal setpoints and a second discussion of the modal gains.

Modal Setpoint

Channel 601A of drive controller 602 receives a modal response signal over path 312A from multi-channel modal filter 310. Say, for example, that the modal response signal processed by channel 601A corresponds to the first out-of-phase bending mode for vibrating conduit(s) 302. The modal response signal is input to subtract stage 608 A as the subtrahend input. The minuend input to subtract stage 608A is the modal setpoint over path 612A. The modal setpoint is the desired level for the corresponding modal response signal. The mode error output signal over path 614A indicates the extent to which the modal response signal deviates from the modal setpoint. The modal setpoint over path 612A can be, but is not limited to, a fixed voltage provided by a voltage reference (not shown) or a value retrieved from a memory (not shown).

The modal setpoint itself is determined as follows. As noted above with respect to EQN. 1, the physical response (x) of a system is related to the modal response ($\eta$) of a system by a set of modal vectors ($\Phi$). The physical response at a given location j due to a given mode i is represented by EQN. 9:

$$x^i_j = \Phi_{ji} \eta_i \quad (9)$$

where:

$x^i_j$ is the scalar physical response at location j due to mode i;

$\Phi_{ji}$ is the element of the eigenvector matrix for the column of mode i and the row of location j; and $\eta_i$ is the scalar modal response of mode i.

EQN. 9 is rewritten in the form of EQN. 10 and solved for the modal setpoint $\eta_{i(s)}$ for node i.

$$\eta_{i(s)} = \frac{x^i_j}{\phi_{ji}} \quad (10)$$

Say one wants the desired physical displacement setpoint ($x^i_j$) for the first out-of-phase bending mode to be 0.015 inch at feedback sensor A. Referring back to EQN. 4, the matrix element ($\Phi_{ji}$) corresponding to feedback sensor A (first row) and the first out-of-phase bend mode (first column) is 25.1. Thus, $\eta_i$, the modal setpoint for mode i (the first out-of-phase bend mode, in this example) is equal to 0.0006.

Modal Gain

Subtract stage 608A subtracts the modal response signal over path 312A from the modal setpoint over path 612A to produce a mode error signal over path 614A to gain stage 610A. As noted above, each channel of drive controller 602 converts a modal response signal to the modal excitation signal that, when applied to vibrating conduit(s) 302, causes vibrating conduit(s) to oscillate such that the modal response signal approaches the modal setpoint for the given mode. The mode error signal over path 614A is amplified by modal gain stage 610A. In a linear, time invariant system, the modal response is related to the modal excitation by the system parameters, i.e., mass stiffness and damping. In modal space these parameters are the modal mass, modal stiffness and modal damping. For a system with mass normalized eigenvectors, the modal mass is unity and the modal stiffness is the square of the natural frequency. In a system excited at resonance, as is the case with a Coriolis flowmeter, the nominal gain to go from modal response to modal excitation is expressed by EQN. 12:

$$(2\zeta\omega_n^2) \cdot N_i \quad (11)$$

where:

$\zeta$ is damping;

$\omega_n$ is mode frequency;

$\eta_i$ is the modal response for mode i; and

Ni is the modal excitation for mode i.

Using the current example where the modal setpoint, i.e., the desired modal response, is given by EQN. 11, the gain, G, applied by gain stage 610A is set as shown in EQN. 12, as follows:

$$G = 2\zeta\omega^2 2 \cdot (0.0005) \cdot (106.2 \cdot 2\pi)^2 = 445.254 \text{ sec}^{-2} \quad (12)$$

Gain stage 610A is therefore configured to have a gain of 445.254. The drive excitation signal over path 618A therefore is the modal force that needs to be applied to vibrating conduit(s) 302 in order that the modal response signal for the corresponding mode match the corresponding modal setpoint. The remaining step, as described below, is to transform the modal excitation into physical excitations that are applied in the form of drive signals over paths 208A–208M. The process described above with respect to channel 601A of drive controller 602 is repeated for each of the remaining channels 601B–601N for each of the remaining modal response signals.

Note that the present invention provides a direct means for influencing one or more modes in a Coriolis flowmeter. For example, if one desires to suppress a certain mode, then the modal setpoint for that mode is zero. Thus, any signal at all in the corresponding modal response signal produces a mode error signal. If one desires to suppress multiple modes, then the modal setpoint for each of the appropriate modes is set to zero. Likewise, one may choose to excite multiple modes by selecting the appropriate modal setpoints for each mode to be excited.

Figure 7:
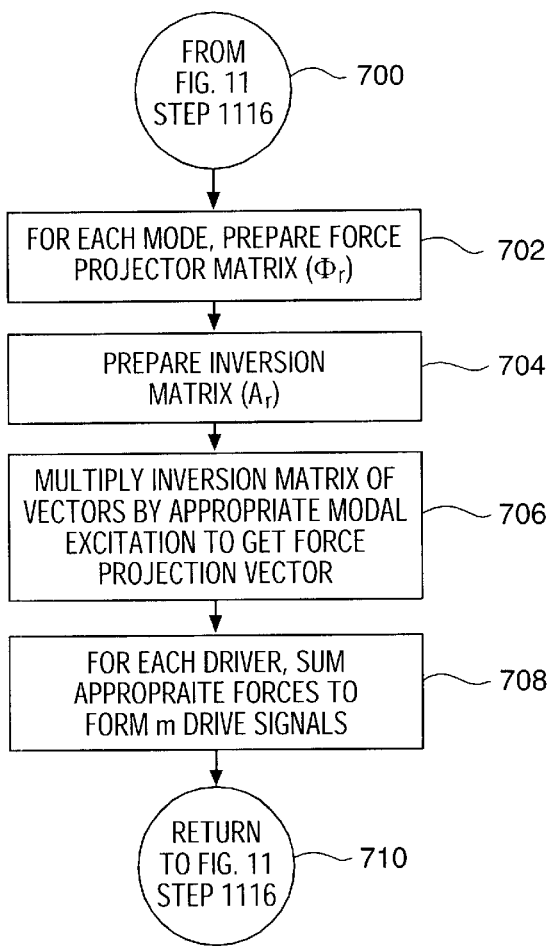
FIG. 7 is a flowchart illustrating the process steps for transforming a scalar modal excitation signal for a physical force projection vector.

Modal-to-physical force projector—FIG. 7

Each channel 601A–601N of drive controller 602 outputs a scalar modal excitation signal which must be expanded into a vector signal to drive each of the m driver(s). A modal-to-physical force projection vector is determined, each element of which is the gain applied to outputs 618A–618N from drive controller 602 to scale the scalar modal excitation signal for each driver to an appropriate amplitude.

The scalar modal drive signal $N_r$ is the modal force required to drive Mode r to the desired response amplitude. The actual modal force applied to the sensor in Mode r is $N_r^{actual}$ as shown in Equation 13.

$$N_r^{actual} = \Phi_r^T F_r N_r \quad (13)$$

where:

$F_r$ is the physical force vector needed to excite the desired mode;

$N_r$ is the scalar mode drive signal; and $\phi_r^T$ is the transpose of a single column of the modal eigenvalue matrix.

In order to ensure that $N_r^{actual} = N_r$, as desired, the physical force vector, $F_r$, should satisfy the following relationship, $\Phi_r^T F_r = 1$. There are many different physical force vectors which satisfy this relationship. In fact, any arbitrary vector, $A_r$, which is not totally orthogonal to $\Phi_r$, i.e., $\Phi_r^T F_r \neq 0$, can be scaled to a desired physical force vector, $F_r$, as follows:

$$F_r = \frac{A_r}{\phi_r^T A_r} \quad (14)$$

Note that the physical force vector ($F_r$) is a single column by m row vector where each row corresponds to a specific drive location. Also note that $\Phi_r^T$ needs to be reduced to the drive physical locations. This makes the matrix $\Phi_r^T$ different from the matrix used for the modal filter and drive controller configuration which was reduced to the feedback sensor locations. EQN. 13 needs to be solved for the physical force vector ($F_r$), i.e., EQN. 13 needs to be inverted. This is done by finding a vector $A_r$ such that:

$$A_r^T \Phi_r = 1 \quad (14)$$

Multiplying both sides of EQN. 15 with vector $A_r$ then gives the transformation from modal excitation to physical force as shown in EQN. 16:

$$A_r N_r = F_r \quad (15)$$

EQN. 16 is the dot product of two vectors which means that one is dealing with vectors and not matrices. Applying certain properties of vectors, it is determined that the vector $A_r$ is expressed as shown in EQN. 17:

$$A_r = \frac{\Phi_r}{|\Phi_r| \cdot |\Phi_r|} \quad (16)$$

where the symbol is $|\ |$ the vector length operator.

An exemplary force projection calculation is now shown for the case of a Coriolis flowmeter having two drivers (m=2). With reference back to EQN. 6, one of the two drivers is located coincident with feedback sensor A and the other of the two drivers is located coincident with feedback sensor L. For the first out-of-phase bend mode, $A_r$ is calculated as shown in EQN. 18:

$$A_r = \begin{pmatrix} 0.0398 \\ 0.0398 \end{pmatrix} \cdot \left( \text{lbf} \cdot \frac{\sec^2}{\text{in}} \right)^{.5} \quad (17)$$

It was shown with respect to EQNs. 9–10 that the modal setpoint for the first out-of-phase bend mode for this example is 0.0006. It was shown with respect to EQNs. 11–12 that the modal gain for the first out-of-phase bend mode for this example is 445.254 sec.$^{-2}$. Thus the modal setpoint times the modal gain for the first out-of-phase bend mode in this example, i.e., the scalar modal excitation signal over path 618A, is equal to 0.2672. These figures are substituted into EQN. 15 to determine the physical force vector $F_r$ for the first out-of-phase bend mode as shown in EQN. 19:

$$A_r N_r = F_r = \begin{pmatrix} 0.0398 \\ 0.0398 \end{pmatrix} \cdot 0.2672 = \begin{pmatrix} 0.0106 \\ 0.0106 \end{pmatrix} \text{lbf} \quad (18)$$

This result says that to drive the sensors to the desired first out-of-phase bend mode, a force of 0.0106 lbs should be applied to the two drivers. Force projection vectors are similarly developed for each mode of interest influenced by a drive system of the present invention.

In order to optimize the drive system of the present invention for a particular drive scheme, consideration should be given to selecting the appropriate force projection vectors. There are a number of issues which may be considerations in choosing the shape of the vector. First, the peak force which any drive must generate to achieve the desired flow tube vibration amplitude should be minimized. A further consideration is to minimize the total energy which the drive system dissipates in achieving the desired flow tube vibration amplitude. Another consideration is to minimize the residual response of other modes.

Figure 11:
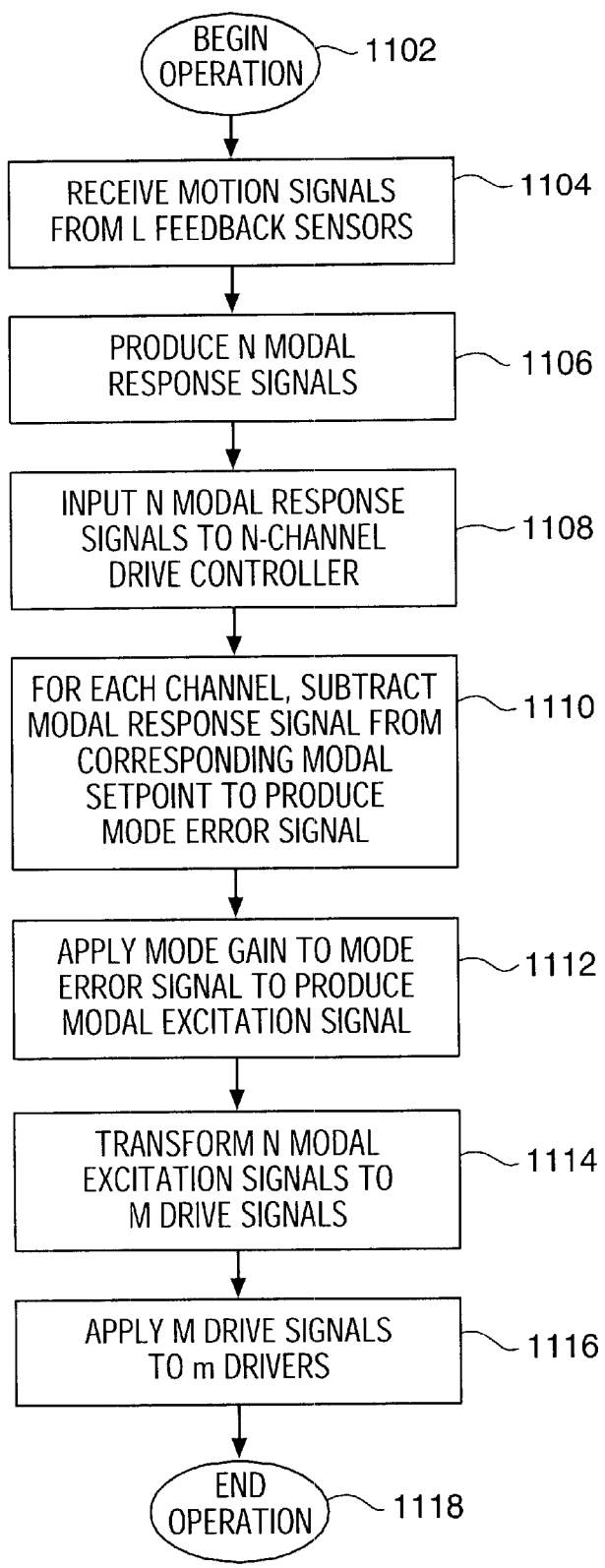
FIG. 11 is a flowchart summarizing the operation of the present invention.

FIG. 11 is a flowchart discussed below as a summary of the present invention. Step 1114 of FIG. 11, the force projection step, is viewed in more detail in FIG. 7. FIG. 7 begins with step 700 from step 1112 of FIG. 11. As noted above, there is a separate force projector channel 620A–620N for every modal response signal. During step 702, the force projector matrix is determined by reducing the total eigenvector matrix to the single column relating to the appropriate mode. Processing then continues to step 704.

During step 704, the inversion matrix ($A_r$) is determined, as described above, by utilizing standard vector properties. Processing now proceeds to step 706. During step 706, EQN. 15 is solved for the force projection vector ($F_r$). Steps 704 and 706 have the effect of scaling the force projector matrix to the correct amplitude, as shown in FIG. 14. Processing then proceeds to step 708. During step 708, the corresponding forces from each channel of the force projector are summed to produce m drive signals. Processing next continues to step 710 and FIG. 11.

Modal-to-physical force propector 604 is implemented using discrete analog components as described with respect to the rest of drive circuit 40. Alternatively, modal-to-physical force projector 604 and the rest of drive circuit 40 is implemented using Analog to Digital Converters (ADC's) to convert the analog motion signals to digital signals. The digital signals are then processed using digital signal processing (DSP) techniques and the resulting drive signals are converted back to analog signals using Digital to Analog Converters (DAC's). Those skilled in the art of electronic signal processing recognize that many different analog or digital (ADC, DSP, DAC) approaches can be used to implement the teaching of the present invention and all of them are equivalent and within the scope of equivalents for the present invention.

Summer Stage—FIG. 6

The signals output from modal-to-physical force projector 604 are summed in summer stage 604 to produce drive signals 208 A–208 M, as follows. As noted above, each channel 620A–620N of modal-to-physical force projector 604 produces as many outputs (M) as there are drivers 206. All of the modal-to-physical force projector 604 outputs corresponding to a driver A, for example are summed by summer 622A to produce drive signal 208 A. Thus, output 620$A_{DA}$, output 620$B_{DA}$ and output 620$N_{DA}$ are all input to summer 622A. The output of summer 622A is drive signal 208A. Drive signals 208B–208N are formed in similar fashion by operation of summers 622B–622M. The number of drives M can be different from the number of modal response signals N which can be different from the number of motion signals L.

Figure 10:
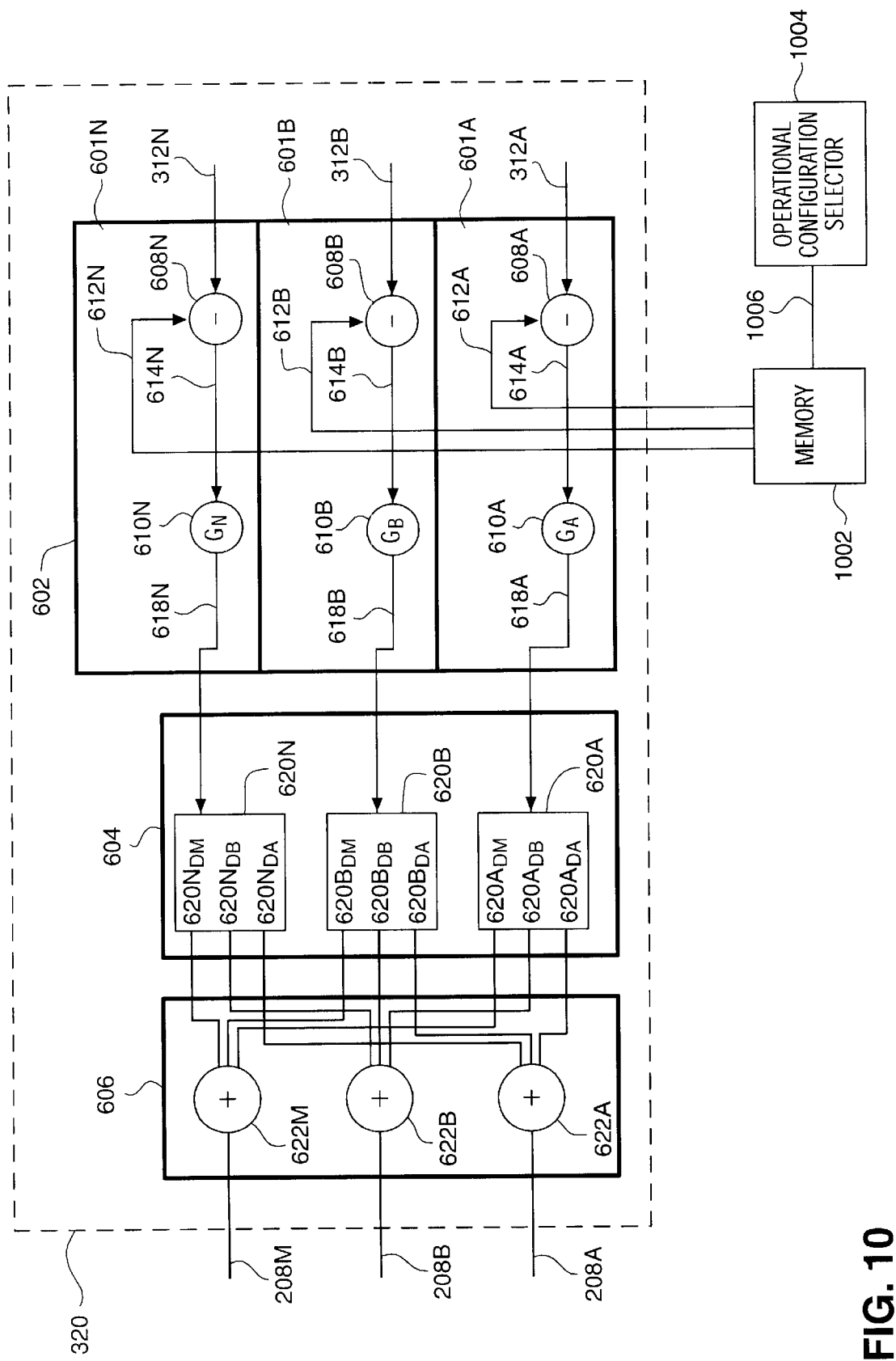
FIG. 10 depicts an alternative drive controller of the present invention.

Multiple Operating configurations—FIG. 10

The unique design of the drive system of the present invention allows for significant and total changes in drive schemes by merely selecting a different set of modal setpoints. The generalized modal space drive control system of the present invention is operated in different operating configurations by setting different modal setpoints for each operating configuration. For example, a first mode of operation for a flowmeter 5 is a mass flow configuration. In the mass flow configuration, for the example of the flowmeter 5 of FIG. 1, the first out-of-phase bending mode is excited and other modes are suppressed. A second configuration for a flowmeter 5 is a pressure measurement configuration. In the pressure measurement configuration, the first out-of-phase bending mode and the first out-of-phase twisting mode are both excited and other modes are suppressed. Flowmeter 5 switches between the first and second operating configurations and its drive scheme is optimized for each mode.

FIG. 10 is similar to the FIG. 6 depiction of modal response signals processor 320 but with the addition of memory 1002 and operating configuration selector 1004. Memory 1002 is a Read Only Memory (ROM), for example. Loaded in memory 1002 is a modal setpoint table (not shown). The modal setpoint table includes a set of N modal setpoints for each operating configuration of the flowmeter. Each set of N modal setpoints includes a modal setpoint corresponding to the N modal response signals. Operating configuration selector 1004 provides a control signal over path 1006 to memory 1002 which determines the set of modal setpoints output by memory 1002 over paths 612A–N. Operating configuration selector 1004 and memory 1002 are preferably part of meter electronics 20. Operating configuration selector 1004 may, for example, be a microprocessor (not shown) in meter electronics 20. The switching from a first operating configuration to one or more alternative operating configurations can be accomplished in any number of ways and is not important to the present invention. One example is that operating configuration selector 1004 could be configured to switch every thirty seconds between a first operating configuration and a second operating configuration. Another example is that operating configuration selector 1004 could be configured so that a first operating configuration is a default operating configuration and that a second operating configuration is used only when, for example, a user depresses a button (not shown) requesting a pressure measurement from flowmeter 5. Further, a first operating configuration could always be in effect with a second operating configuration periodically used in addition to the first operating configuration.

Summary—FIG. 11

FIG. 11 is a flowchart summary of the drive system of the present invention. Steps 1102–1106 deal with transforming the physical motion of a vibrating conduit to SDOF modal response signals. Steps 1108–1112 operate in the modal domain to generate modal excitation signals from the modal response signals. It is in the modal domain where the signals are manipulated to influence vibration modes. Steps 1114–1118 operate to transform the modal excitation signals to the physical domain, map the excitation signals to the driver(s) and apply the drive signals to the driver(s).

Processing begins with step 1102 when a Coriolis flowmeter or densimeter begins operation. In step 1104, L motion signals are received from L feedback sensors indicating the motion of various points along a vibrating conduit. During step 1106, N modal response signals are generated from the L motion signals. Each modal response signal, typically a SDOF signal, corresponds to one mode of vibration present on the vibrating conduit. The N modal response signals are input to an N-channel drive controller during step 1108.

During step 1110, a mode error signal is generated for each modal response signal by applying each modal response signal to its corresponding modal setpoint. The mode error signal is amplified by a mode gain, during step 1112, to produce a modal excitation signal for each mode.

During step 1114, each modal excitation signal is transformed to a physical force vector where each element of the physical force vector corresponds to one of m driver(s). Step 1114 is described in greater detail in FIG. 7. Processing next proceeds to step 1116 where the m drive signals are applied to the m driver(s) causing the vibrating conduit to vibrate in the desired modes. Processing concludes with step 1118.

Although specific embodiments are disclosed herein, the scope of the invention is not limited to those specific embodiments, but is rather defined by the following claims.

We claim:

1. A drive system for vibrating a conduit, said drive system comprising:

a drive means positioned adjacent said conduit and responsive to a drive signal for vibrating said conduit;

L motion sensors for producing L motion signals indicative of the movement of said conduit at the respective points of attachment of said L motion sensors to said conduit, wherein L is equal to or greater than 2;

a modal response signal means that receives said L motion signals and produces N modal response signals wherein each of said N modal response signals corresponds to one of a plurality of vibration modes, wherein N is equal to or greater than 2;

N modal filter channels in said modal response signal means wherein each of said N modal filter channels receives at least two of said L motion signals as input and produces one of said N modal response signals as an output;

a drive controller means responsive to a production of said N modal response signals for producing N modal excitation signals, wherein each of said N modal excitation signals representing the modal excitation is used to achieve a desired modal response level for a respective vibration mode; and a modal-to-physical force projector means responsive to said N modal excitation signals for producing M drive signals wherein said M drive signals cause said drive means to vibrate said conduit in desired modes, wherein M is more than 1.

2. The drive system of claim 1 wherein said drive means comprises:

M drive means positioned adjacent said conduit and each of said M drive means responsive to one of said M drive signals.

3. The drive system of claim 1 wherein said modal response signal means comprises:

N frequency bandpass filters each of which receives one of said L motion signals as an input and each of which outputs one of said N modal response signals.

4. The drive system of claim 3 wherein said modal response signal means further comprises:

N integration means for integrating each of said N modal response signals.

5. The drive system of claim 1 wherein each of said N modal filter channels comprises:

first weighting means for applying a first weighting factor to a first one of at least two of said L motion signals to develop a first weighted signal;

second weighting means for applying a second weighting factor to a second one of said at least two of said L motion signals to develop a second weighted signal; and modal filter summing means for combining said first weighted signal and said second weighted signal to produce one of said N modal response signals.

6. The drive system of claim 5 wherein said first and second weighting factors are determined through trial and error.

7. The drive system of claim 5 wherein said first and second weighting means are determined through experimental analysis.

8. The drive system of claim 5 wherein said first and second weighting means are determined through numerical analysis.

9. The drive system of claim 1 wherein each of said N modal response signals is substantially a single degree of freedom modal response signal corresponding to said one of said plurality of vibration modes.

10. The drive system of claim 1 wherein said drive controller means comprises:

N drive controller channels each having as input one of said N modal response signals and each producing one of said N modal excitation signals as an output.

11. The drive system of claim 10 wherein each of said N drive controller channels comprises:

modal response setpoint means for setting a modal setpoint value to define a desired said modal response level for a given one of said plurality of vibration modes;

compare means for comparing said desired modal response level to the corresponding one of said N modal response signals to produce a mode error signal; and gain means responsive to said mode error signal for producing a one of said N modal excitation signals.

12. The drive system of claim 11 wherein said modal response setpoint means is configured to set said modal setpoint value to zero to produce said one of said N modal excitation signals having a zero level.

13. The drive system of claim 11 wherein said modal response setpoint means is configured to set said modal setpoint value to a non-zero value to produce said one of said N modal excitation signals having a non-zero level.

14. The drive system of claim 1 further comprising:

selection means for selecting between multiple operating configurations of said drive system; and adjustment means responsive to said selection means for adjusting modal response setpoints.

15. The drive system of claim 14 wherein said selection means comprises:

a memory containing a set of said modal response setpoints for each of said multiple operating configurations; and an operating configuration selector for choosing one of said sets of modal response setpoints from said memory.

16. The drive system of claim 15 wherein said adjustment means comprises:

means responsive to said operating configuration selector for replacing a first set of modal response setpoints in N drive controller channels with a second set of modal response setpoints.

17. The drive system of claim 1 wherein said modal-to-physical force projector means comprises:

N modal-to-physical signal transformation means each having as an input one of said N modal excitation signals and each responsive to a respective one of said N modal excitation signals for producing a drive component signal;

said drive component signal representing a force at said drive means to influence said one of said plurality of vibration modes to a desired modal response level; and summing means for summing N drive component signals output from said N modal-to-physical signal transformation means to produce one of said M drive signals.

18. A method of operating a drive system for vibrating a conduit, comprising the steps of:

receiving a drive signal for vibrating said conduit;

receiving L motion signals from L motion sensors, each of said L motion signals being indicative of the movement of said conduit at the respective point of attachment of said L motion sensors to said conduit, wherein L is equal to or greater than 2;

decomposing said L motion signals to produce N modal response signals wherein each of said N modal response signals corresponds to one of a plurality of vibration modes and each of said N modal response signals is generated from at least two of said L motion signals, wherein N is equal to or greater than 2;

generating N modal excitation signals responsive to said N modal response signals wherein each of said N modal excitation signals represents the modal excitation used to achieve a desired modal response level for a respective vibration mode;

transforming said N modal excitation signals from the modal domain to the physical domain to form M drive signals, wherein M is at least 1; and applying said M drive signals to M drivers causing said conduit to vibrate.

19. The method of claim 18 wherein said decomposing step includes:

filtering said L motion signals through N modal filter channels wherein each of said N modal filter channels receives all of said L motion signals as input and outputs one of said N modal response signals.

20. The method of claim 18 wherein said generating step includes:

receiving said N modal response signals in N respective drive controller channels;

subtracting a respective one of said N modal response signals from a respective modal response setpoint to generate a respective mode error signal; and amplifying said respective mode error signal by a mode gain to generate a respective modal excitation signal within each of said N respective drive controller channels.

* * * * *

UNITED STATES PATENT AND TRADEMARK OFFICE
CERTIFICATE OF CORRECTION

PATENT NO. : 6,360,175 B1
DATED : March 19, 2002
INVENTOR(S) : Timothy J. Cunningham and Stuart J. Shelley It is certified that error appears in the above-identified patent and that said Letters Patent is hereby corrected as shown below:

Column 15,
Line 16, replace "(x) of a system is related to the modal response ($\eta$) of a" with
-- (x) of a system is related to the modal response ($\eta$) of a --
Line 66, replace "$(2\zeta\omega_n^2) \cdot N_i$"

with -- $(2\zeta\omega_n^2) \cdot \eta_i = N_i$ --

Column 16,
Line 13, replace "$G = 2\zeta\omega^2 2 \cdot (0.0005).(106.2 \cdot 2\pi)^2 = 445.254 \sec^{-2}$"

with -- $G = 2\zeta\omega^2 = 2 \cdot (0.0005).(106.2 \cdot 2\pi)^2 = 445.254 \sec^{-2}$ --

Signed and Sealed this

Eleventh Day of February, 2003

JAMES E. ROGAN
*Director of the United States Patent and Trademark Office*